United States Patent [19]

Kobayashi

[11] 4,005,459

[45] Jan. 25, 1977

[54] INTERLOCKED MANUAL STOP-DOWN AND MIRROR-UP MECHANISM FOR SINGLE LENS REFLEX CAMERA

[75] Inventor: Takumi Kobayashi, Asaka, Japan

[73] Assignee: Asahi Kogaku Kogyo Kabushiki Kaisha, Tokyo, Japan

[22] Filed: July 8, 1975

[21] Appl. No.: 594,178

[30] Foreign Application Priority Data

July 12, 1974  Japan .............................. 49-80348

[52] U.S. Cl. .............................. 354/156; 354/239; 354/272
[51] Int. Cl.² ........................................ G03B 19/12
[58] Field of Search .......... 354/152, 156, 237, 239, 354/272, 270, 47, 202

[56] References Cited

UNITED STATES PATENTS

| | | | |
|---|---|---|---|
| 3,442,192 | 5/1969 | Sato | 354/156 |
| 3,581,642 | 6/1971 | Nomura et al. | 354/152 |
| 3,640,202 | 2/1972 | Nomura | 354/156 |
| 3,829,872 | 8/1974 | Ueda et al. | 354/156 |
| 3,893,141 | 7/1975 | Uno et al. | 354/156 |

*Primary Examiner*—John Gonzales
*Attorney, Agent, or Firm*—Sughrue, Rothwell, Mion, Zinn & Macpeak

[57] ABSTRACT

A manual stop button or depth of field button is coaxially mounted in a shaft portion of a self-timer charging lever, and a lens stopping-down operation is carried out by pushing the stop button into a predetermined depressed position when the self-timer charging lever is located at its return position, and a mirror-up operation is carried out at that stop-down condition by turning the self-timer charging lever a predetermined angle in the opposite direction to that effecting self-timer charging operation. A return movement of the stop button is prevented by locking the stop button at a depressed position once manual depression of the stop button is completed to make it impossible for the stop button to move in the spring biased return thrust direction. The stop button is returned by manually turning the self-timer charging lever in the opposite direction to that determining the mirror-up condition of the camera to return position and the manual operation of the self-timer charging lever to accomplish mirror-up operation is rendered impossible unless the stop button is in depressed position.

6 Claims, 7 Drawing Figures

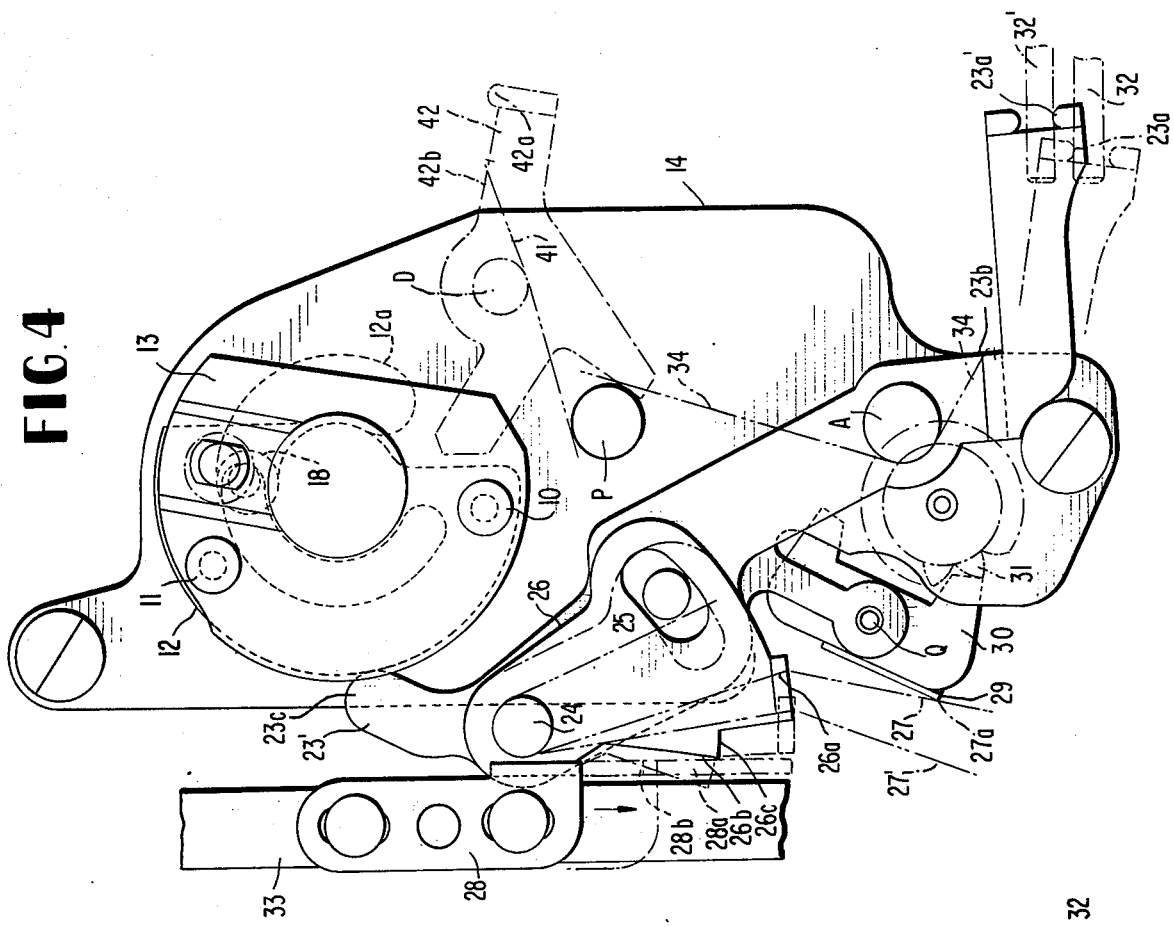
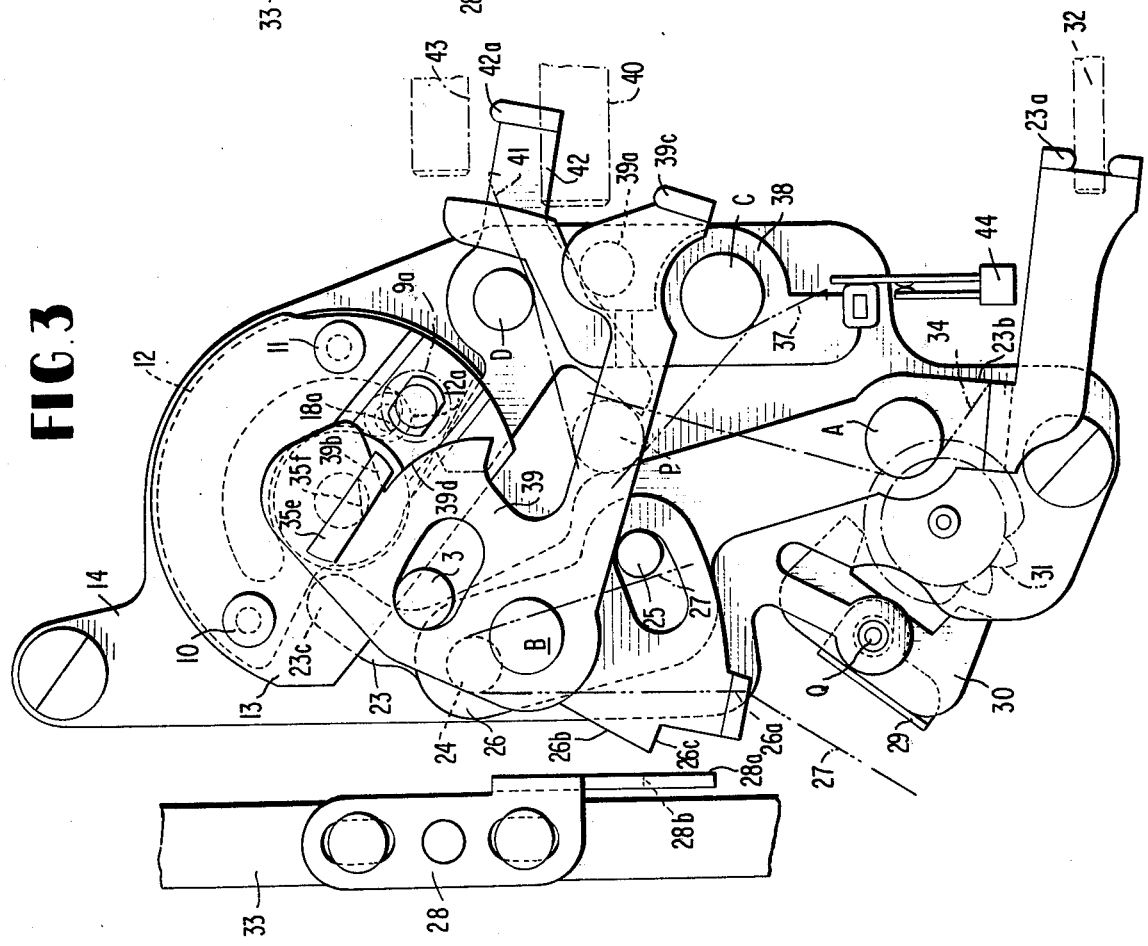

INTERLOCKED MANUAL STOP-DOWN AND MIRROR-UP MECHANISM FOR SINGLE LENS REFLEX CAMERA

BACKGROUND OF THE INVENTION

1. Field of the Invention

The present invention relates to a manual stop and mirror-up mechanism for a single lens reflex camera.

2. Description of the Prior Art

It is customary that a variety of up-to-date single lens reflex cameras are equipped not only with a manual stop mechanism for confirming a depth of field, but also with a mirror-up mechanism for prevention of mirror shock when the camera is employed in microphotography and in photocopy work and for a preliminary mirror-up operation when a short focus lens such an ultrawide angle lens is employed during the photographic process.

For a camera in which a slit exposure is accomplished as in a focal plane shutter, the mirror-up operation will possibly lead to initiation of shutter movement prior to completion of the stopping-down operation, which in turn causes a blur in the photographic image obtained, and the stopping-down operation has to be accomplished concurrently with the mirror-up operation. For a single lens reflex camera including a self-timer mechanism, moreover, much space is of course required by respective components, and still worse, its respective actuating members must be mounted to the outside of the camera body which deteriorates materially the appearance and design of the camera.

SUMMARY OF THE INVENTION

Therefore, according to the present invention, the manual stopping-down operation is carried out by depression or pushing of a manual stop button which is mounted in a pivot shaft portion of a self-timer charging lever and the mirror-up operation is also carried out by turning the self-timer charging lever in the opposite direction to the self-timer charging operation only when the stop-down operation of the manual stop button is completed. Thus, the above three actuating members can be located at the same position with the resultant advantage in improvement in appearance and design of the camera and in providing an assembly which requires less components and less total space for these components.

The present invention will now be described in more detail in conjunction with the following embodiment as shown in the accompanying drawings.

BRIEF DESCRIPTION OF THE DRAWINGS

FIG. 3 is a front elevational view of a portion of the camera of FIG. 1 illustrating the self-timer, the manual stop mechanism, and the mirror-up actuating mechanism when in the restored position.

FIG. 4 is a front elevational view similar to that of FIG. 3 with the components in position after the self-timer charging operation has been accomplished.

DESCRIPTION OF THE PREFERRED EMBODIMENT

Figure 1:
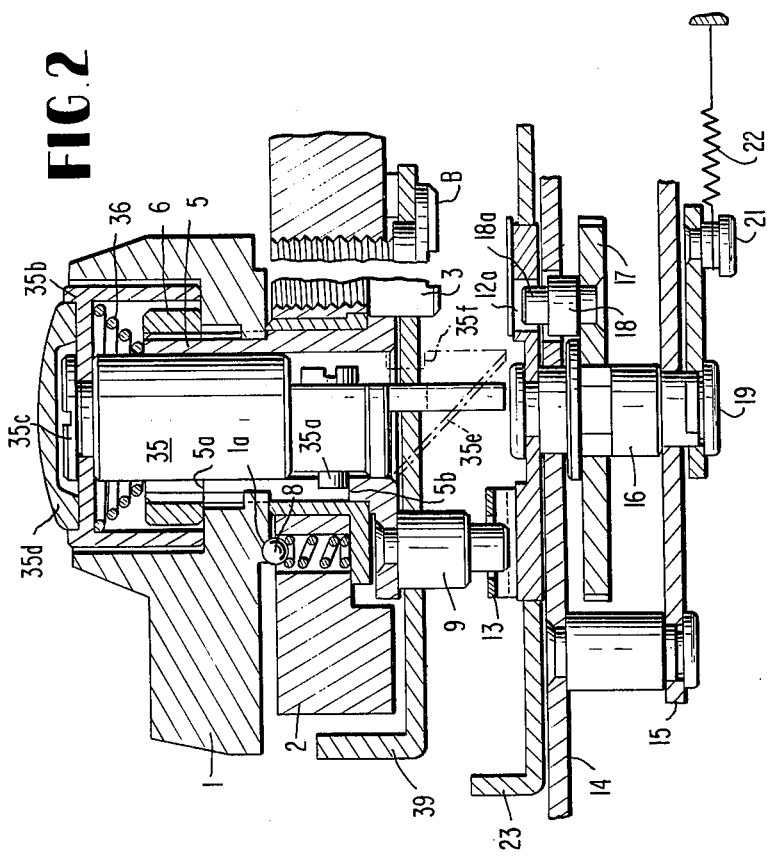
FIG. 1 is a sectional view of a portion of a single lens reflex camera employing the mechanism of the present invention with the manual stop actuating button condition prior to manual stopping-down operation.
Figure 7:
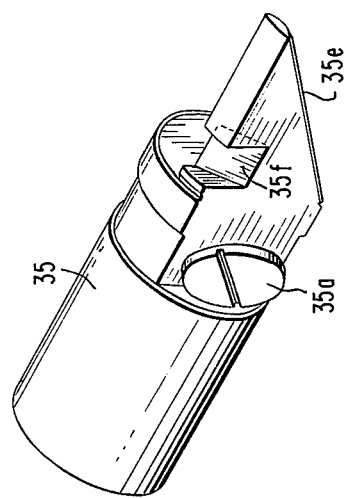
FIG. 7 is a perspective view of the manual stop button employed in the mechanism of the present invention.
Figure 2:
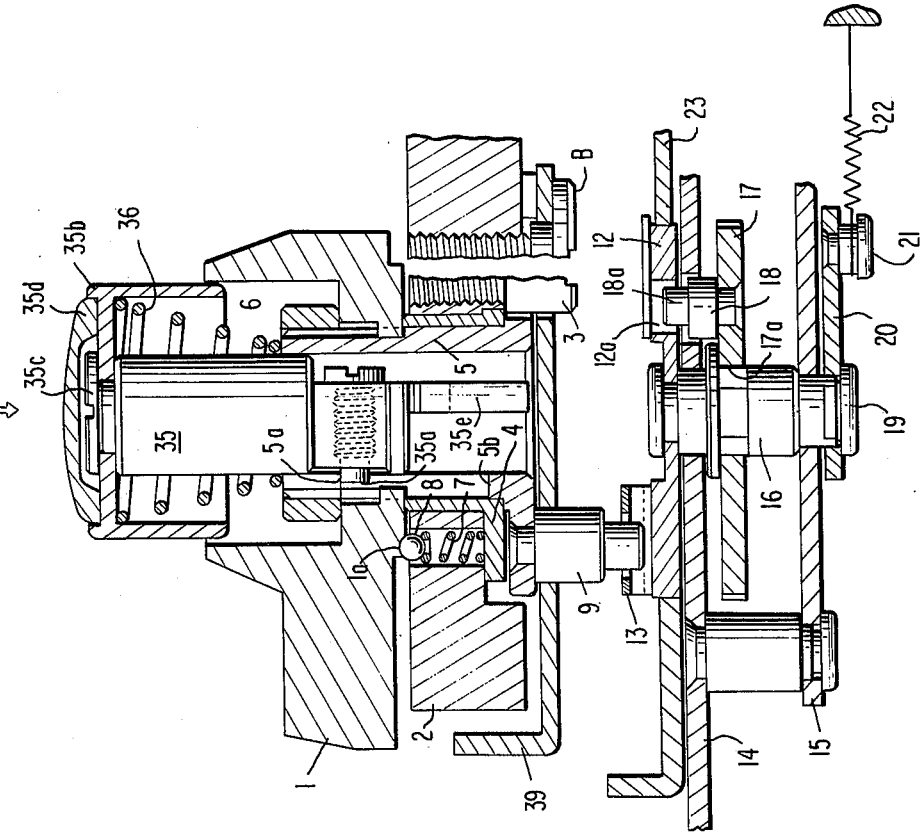
FIG. 2 is a similar sectional view at the time that manual stopping-down operation has been accomplished.

Reference to FIGS. 1 and 2 illustrate the invention as applied to a camera having a camera body 2 rotatably supporting a self-timer charging lever 1, the lever 1 being fixed by way of nut 6 to a sleeve 5 which is rotatably mounted on a bearing 4, the bearing being in turn fixed to a camera body 2 by means of screws (not shown). An intermediate lever stop pin 3 is threadably fixed to camera body 2. Thus, when the self-timer charging lever 1 is rotated or turned about the sleeve 5, a click stop acts on lever 1 obtained by the combined actions of a compression spring 7, a steel ball 8 within a bore of the camera body and the compression spring 7 pressing the ball 8 into a recess 1a of the self-timer charging lever 1 within its lower surface. When the lever 1 is turned counterclockwise by predetermined angle, a restricting member 13 which is secured to a cam 12 by means of rivets 10 and 11, FIG. 3, is turned by a pin 9 which is anchored to the sleeve 5, and at the same time, cam 12 which is rotatably fitted on a first self-timer gear shaft 16 and which, in turn, is rotatably supported on upper and lower frame plates 14 and 15 of the self-timer, is accordingly rotated counterclockwise. The cam 12 is provided with an oval groove 12a which is brought into abutting engagement with the edge of leading end 18a of pin 18, anchored to the first gear 17. The first gear 17 which is provided with a rectangular hole or opening 17a and is press fitted via hole 17a onto a first gear shaft 16 for rotation therewith is rotated counterclockwise about the axis of shaft 16. A self-timer driving member 20 is fixed by means of screw 19 to an oval portion of the first gear shaft 16, FIG. 1, and also rotates counterclockwise, and a self-timer driving spring 22 is fixed by a spring holding pin 21 to the self-timer driving member 20, the opposite end of the spring 22 being fixed to the camera body 2 as shown. This completes the self-timer charging operation in so far as the elements pertinent to the present invention are concerned.

On the other hand, a self-release member 23 is rotatably mounted on a shaft A, FIG. 3, for rotation about a vertical axis, the shaft A being fixed to the upper frame plate 14. Member 23 is biased by a spring 34, wrapped about shaft A by having one end 34a bent over an edge 23b of the self-release member 23 and the other end abutting a pin P fixed to plate 14, the spring 34 biasing the self-release member 23 so as to rotate it clockwise, FIG. 3. The self-release member 23 is shifted counterclockwise by the action of cam 12 acting on portion 23c to the position shown in FIG. 4. A spring 27 is mounted on member 23, the spring 27 being rotatably supported on a pin 24 fixed to member 23 and having one end abutting pin 25 and the other end terminating in a bent portion pressing on end 26a of an anchor changeover member 26. The spring 27 acts to bias the anchor changeover member 26 for rotation in a clockwise direction about a pin 24, FIG. 3. With this type of construction, when the self-release member 23 rotates counterclockwise about shaft A by cam 12, the projection portion 26b of member 26 is brought into abutment with a bent portion 28a of a self-timer actuating member 28 and the leading end 27a of the spring 27 is brought into abutment with an anchor retaining plate 29, FIG. 4, to thereby bias anchor 30 for rotation in a counterclockwise direction. Anchor 30 comprises a C-shaped plate pivoted by pin Q to plate 14. Therefore, the self-timer charging operation is made possible since a star gear 31 is retained by the pivotable anchor 30 which is spring biased by spring 27, anchor 30 contacting the leading end 27a of the spring.

A bifurcated portion 23a of the self-release member 23 receives the projecting end of the pin 32, FIG. 3, the pin 32 being anchored to a mirror-operation retaining plate (not shown) for self-operation which, in turn, is juxtaposed to an actuating member retaining plate (not shown) for manual operation disposed in a mirror box (not shown) so that the pin 32 may be shited to position 32', FIG. 4, to thereby retain the mirror actuating member. The other parts of this mechanism are not pertinent to the present invention and have been purposely not shown or described.

In the case where the releasing operation of a self-timer is to be accomplished, the pushing or axial shifting operation of a shutter rod 33, FIG. 3, FIG. 4, allows the mirror actuating member retaining plate (not shown) to be released from its retained condition by a release member (not shown) mounted on the shutter rod 33. At the same time, the abutment between the bent portion 28a of the self-timer actuating member 28 which is fixed to the shutter rod 33 and a projecting portion 26b of the anchor changeover member 26 is effected. Abutment engagement occurs between the uppermost edge 28b of the bent portion 28a of the self-timer actuating member 28 and a recessed portion 26c of the anchor changeover member 26 forming projection portion 26b. The leading end 27a of spring 27 is released from its biasing contact with the anchor retaining plate 29, the spring 27 being shifted to the position 27', FIG. 4, thus releasing the anchor 30. The star gear 31 which is biased clockwise by the self-timer driving spring 22, FIG. 1, rotates in a clockwise direction, FIG. 3. As a result, the cam 12 is turned clockwise, FIG. 4, to restore it to its initial position, FIG. 3, and the self-release member 23 also restores to its initial position as shown in FIG. 3. Thus, the pin 32 received by the bifurcated portion 23a of the self-release member 23 returns from its upper position, FIG. 4, to its lower position, and the retaining plate (not shown) of the mirror actuating member, (not shown), for self-operation, is released from the mirror actuating member so that the mirror may be shifted to allow the shutter (not shown) to operate, thus completing the photographing operation.

In the case, moreover, where photography employing a self-timer becomes unnecessary after the self-timer charging operation, the self-timer charging lever 1 may be manually returned to its initial position, FIG. 1. Then the self-release member 23 is also returned to the position shown in FIG. 3 and the pin 32 shifts to the lower position from the upper position in FIG. 4. At the same time, only the self-operation retaining plate is released from the mirror actuating member (not shown), but the mirror actuating member itself is kept retained by another mirror-operation retaining member (not shown), the spring 27 which affords the clockwise rotating characteristics to the anchor changeover member 26 rotatably supported on pin 24 on the self-timer releasing member 23 and which provides the counterclockwise rotating bias to the anchor 30, while it is in abutment with the anchor retaining plate 29, has its leading end 27a move away from the anchor retaining plate 29 to the position shown in FIG. 3. The star gear 31 turns clockwise one tooth, and the self-timer driving member is returned to its initial position by the action of the self-timer driving spring 22, thus completely restoring the operating condition of the mechanism to those before initiation of the self-timer charging operation.

Figure 5:
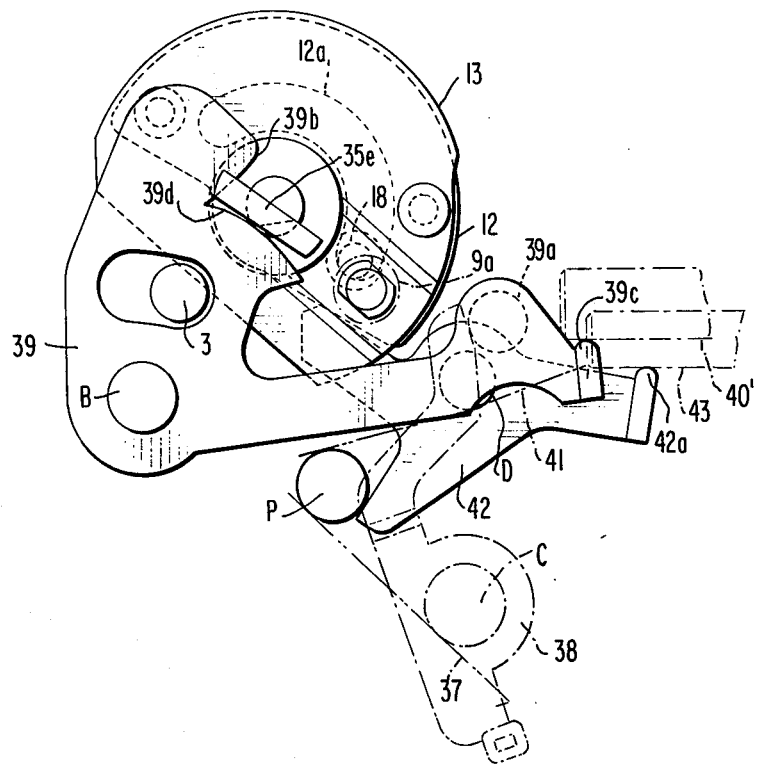
FIG. 5 is a similar front elevational view to that of FIGS. 3 and 4 but showing only a portion of the components of the manual stop mechanism and the mirror-up actuating mechanism at the time manual stopping-down operation has been accomplished.

The single manual stopping-down operation will now be described as follows. In FIG. 1, a depressible, manual stop button 35 is illustrated as supporting a stopper pin 35a fixed thereto by a screw. This stop pin 35a rides laterally within slot 5a–5b formed within sleeve 5. A cylindrical casing 35b is concentrically mounted on the button 35 by a screw 35c in a position pressing against a coil return spring 36. The cylindrical casing 35b is covered by a disc-shaped pressing member 35d. When this pressing member 35d is pushed in the direction of the arrow, FIG. 1, against the action of the biasing spring 36, an inclined portion 35e, FIG. 2, of the button 35 is brought into abutment engagement with a notched portion 39b, FIG. 5, of an intermediate stop member 39, the stop member 39 being rotatably supported on a shaft B fixed to body 2. The intermediate stop member 39 is biased so as to rotate clockwise by way of pin 39a fixed to member 39 and which abuts against an edge of a memory lock lever 38. The memory lock lever 38 is rotatably supported on a shaft C fixed to the upper frame plate 14 and is biased for clockwise rotation, FIG.3, by the action of a spring 37, the spring 37 being wrapped about the shaft C and having one end bent over the edge 38a of the memory lock lever 38 and the other end abutting fixed pin P. Thus, a clockwise rotational bias is afforded to member 39. At the same time, a bent portion 39c of the intermediate stop member 39 which rests against one edge of a pin 40 anchored to a stop lever (not shown) which is journaled to the mirror box (not shown) is responsive to shifting of that pin 40, Shifting of the pin 40 to the stop-down position acts to complete the stopping-down operation, by way of additional mechanism purposely not shown.

Figure 6:
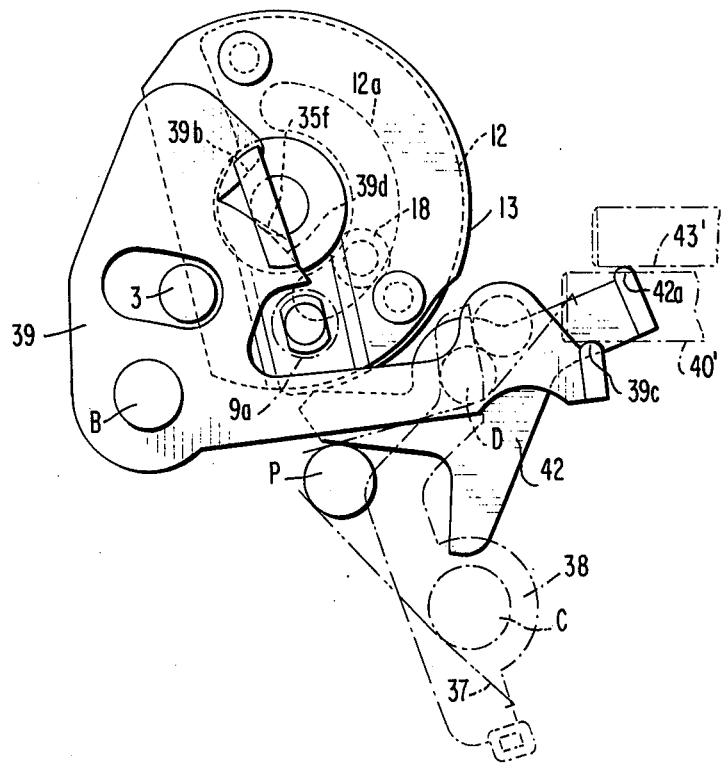
FIG. 6 is a similar view to that of FIG. 5 showing the manual stop mechanism and the mirror-up actuating mechanism after mirror-up operation has been completed.

Explanation will now be made as to the situation where the mirror-up operation is carried out. In this case, the self-timer charging lever 1 is manually turned or rotated clockwise, in the opposite direction, to that employed for self-timer charging operation, the manual stop button 35 will be driven clockwise by predetermined angle through stop pin 35a. Cam 12 will also be turned clockwise due to engagement between pin 9 and the intermediate member 13, both secured to the sleeve 5. As a result, an intermediate mirror-up member 42, FIG. 3, which is rotatably supported on a fixed shaft D secured to the upper frame plate 14 and which is biased to rotate in a clockwise direction by the action of a spring 41, is driven counterclockwise. Spring 41 has an intermediate portion wrapped about the shaft D, one end bent over an edge 42b of the intermediate mirror-up member 42 and the opposite end in abutment with the fixed pin P. Member 42 rotates from the position shown in FIG. 5 to the position shown in FIG. 6. A pin 43 which is abutment with a bent portion 42a of the intermediate mirror-up member 42 and which is anchored to a mirror-up member (not shown) journaled in the mirror box (not shown), is shifted to dotted line position 43′, FIG. 6, thus acting to complete the mirror-up operation. As shown in FIG. 6, on the other hand, when the projecting portion 39d of the intermediate stop member 39 moves into a notched portion 35f, FIG. 1, of the stop button 35, the stop button 35 is locked against the action of the return spring 36. The mechanism comprises a mechanical interlock means for push button 35 and charging lever 1. However, all of these members may be released by returning the charging level 1 to its initial position after first being rotated clockwise to mirror-up position. Thus, charging lever 1 cannot be rotated clockwise until the stop button is depressed but, upon first rotating the level 1 clockwise to the mirror-up position with the push button 35 depressed and then returning it to its initial position, the interlock between lever 1 and push button 35 terminates.

It should be noted that even if the mirror-up operation were to be attempted without effecting the stopping-down operation, an erroneous mirror-operation can be obviated. This is because the necessary rotary motion is prevented due to the abutment between the projecting portion 39d of the intermediate stop member 39 and the outer periphery 9a of pin 9 (depicted by double-dotted lines FIG. 3), anchored to sleeve 5.

For the single lens reflex camera of the TTL automatic exposure type, moreover, it is necessary that the memory of the photometric level should be locked before the stopping-down operation and the mirror-up operation. This necessity can, however, be satisfied because the memory lock lever 38, which is rotatably supported on shaft C fixed to the upper frame plate 14 as shown in FIG. 3 and which is biased to rotate clockwise by the action of the spring 37, is turned counterclockwise by the stopping-down operation in such a manner that the memory switch 44 is rendered nonconductive immediately before the completion of the stopping-down operation. Thus, the photometric level can be memorized as it is. At the next stage, the memory-lock lever 38 is returned to its initial position by the stop releasing operation, and the memory switch 44 is rendered again conductive to allow the photometric operation to be employed for subsequent photography.

While the invention has been particularly shown and described with reference to a preferred embodiment thereof, it will be understood by those skilled in the art that various changes in form and details may be made therein without departing from the spirit and scope of the invention.

What is claimed is:

1. In a single lens reflex camera including a camera body, a self-timer mechanism within said body, a manual lens stopping-down mechanism within said body, and a mirror-up mechanism, the improvement wherein: said self-timer mechanism comprises a self-timer charging lever pivoted to said body for movement in a first direction between an initial, uncharged position and a charged position at an angle thereto and in a second direction between said initial position and a mirror-up position angularly displaced therefrom, and wherein a stop button is coaxially mounted at said self-charging lever pivot point for limited depression to effect a stopping-down operation when said self-timer charging lever is located at its initial position, and said camera comprises mechanical interlock means responsive to initial depression of said stop button with said self-timer charging lever at said initial position for preventing initiation of a mirror-up operation unless said stop button is initially depressed prior thereto, and to prevent a return movement of said stop button, after depression, unless said self-timer charging lever is manually rotated from said mirror-up position in the opposite direction to that achieving mirror-up action to said initial position, therefore terminating camera stop-down condition.

2. The single lens reflex camera as claimed in claim 1, wherein said interlock means comprises an intermediate stop member pivotably mounted within said body for rotation about a pivot axis parallel to the axis of said stop button to the side of said stop button, biasing means for said intermediate stop member, said manually depressible stop button including an inclined edge portion and a notched edge portion on the opposite sides thereof, said intermediate stop member including a notched portion forming one edge which contacts said inclined edge portion of said intermediate stop member to rotate said intermediate stop member against said bias and another edge which is receivable within said notched edge portion of said stop button upon rotation of intermediate stop member to a predetermined extent, upon depression of said stop button to said limited extent to maintain said stop button in depressed position, and said camera further includes means responsive to rotation of said intermediate stop member against said bias upon depression of said push button by contact of said inclined edge portion to initiate a camera lens stopping-down operation.

3. The single lens reflex camera as claimed in claim 2, wherein said self-timer charging lever concentrically surrounds said depressible manual stop button for rotation about a common axis therewith, and said camera further comprises a cam member mounted within said camera body for pivoting about said common axis, means responsive to rotation of said self-timing charging lever in either of two directions for pivoting said cam about said cam about said common axis, an intermediate mirror-up member pivotably mounted to said camera body for rotation abut an axis parallel to the axis of rotation of said cam, means spring biasing said intermediate mirror-up member for rotation about its pivot axis in a direction to restrain camera mirror-up operation, and wherein said intermediate mirror-up member includes an arm having a surface portion thereof positioned in the path of rotation of said cam such that rotation of said self-timer actuator lever between an initial timer uncharged position in said second direction to a mirror-up position angularly displaced therefrom, causes said cam in contact with said intermediate mirror-up member arm to rotate said arm and said intermediate mirror-up member against its spring bias to initiate camera mirror-up operation.

4. The single lens reflex camera as claimed in claim 3, wherein said mechanical interlock means comprises a first pin movable with said self-timer charging lever about said pivot axis defined by said manually depressible stop button and a surface portion of said pivotable intermediate stop member is positioned in the path of movement of said first pin such that, unless said manually depressible stop button is depressed to the extent of shifting said surface portion out of the path of movement of said pin, rotation of said self-timer charging lever in the second direction from said initial position to said mirror-up position is prevented and initiation of a mirror-up operation is prevented.

5. The single lens reflex camera as claimed in claim 4, wherein a restricting member is mounted within said camera for movement with said cam and operatively engages said first pin rotatable with said self-timer charging lever for selectively driving said cam clockwise or counterclockwise about the axis of said manually depressible stop button and said self-timer charging lever, said cam includes a semi-circular slot therein, a second pin received within said semi-circular slot is fixedly mounted to a first gear for rotation about a first gear shaft coaxial with said manual stop button and spaced therefrom, and a self-timer driving member is fixed to said first gear shaft and rotatable therewith against a spring bias in response to rotation of said cam to effect initiation of self-timer charging.

6. The single lens reflex camera as claimed in claim 5, further comprising a self-release member pivotably mounted to said camera body for pivoting about an axis parallel with the axis of rotation of said cam and to the side of said cam, means for spring biasing said self-release member for rotation in a first direction, means responsive to rotation of said cam in a direction opposite that achieving mirror-up operation for rotating said self-release member in a direction in opposition to its bias, an anchor pivotably mounted on said camera body adjacent said self-release member, a star gear pivotably mounted for rotation about a fixed axis within said camera body adjacent said pivotable anchor, spring means carried by said self-release member and movable in response to movement of said self-timer charging lever to charging position for biasing said anchor into engagement with the teeth of said star gear to rotate said star gear incrementally in one direction, means responsive to pivoting of said self-release member against its bias during self-timer charging to effect mirror retention within said camera, a shutter rod slidably mounted within said camera for movement from a first to a second position to effect release of said self-timer charging lever after pivoting between said initial uncharged position and a charged position at an angle thereto in a first direction, an anchor changeover member pivotably mounted on said self-release member and carrying said spring member biasing said anchor retaining plate into engagement with said star gear, said shutter rod supporting a self-timer actuating member fixedly mounted thereto for movement therewith, and second interlock means between said self-timer actuating member and said anchor changeover member and responsive to shifting of said shutter from said first to said second axially displaced positions for releasing the spring bias acting on said anchor to permit said star gear to rotate one tooth position in a direction opposite that effected by rotation of said anchor under said spring bias during self-timer charging to restore said cam to its initial position, release said self-timer charging lever and return said lever from said charged position to said initial uncharged position and to terminate mirror retention.

* * * * *